United States Patent
Huang et al.

(10) Patent No.: US 8,488,970 B2
(45) Date of Patent: Jul. 16, 2013

(54) MICROWAVE TRANSMISSION APPARATUS, SIGNAL PROCESSING METHOD AND DEVICE IN MICROWAVE TRANSMISSION APPARATUS

(75) Inventors: Xiongbin Huang, Shenzhen (CN); Tianxiang Wang, Shenzhen (CN); Haiou Gou, Shenzhen (CN); Dejun Li, Shenzhen (CN)

(73) Assignee: Huawei Tecnologies Co., Ltd., Shenzhen (CN)

( * ) Notice: Subject to any disclaimer, the term of this patent is extended or adjusted under 35 U.S.C. 154(b) by 318 days.

(21) Appl. No.: 12/979,174

(22) Filed: Dec. 27, 2010

(65) Prior Publication Data
US 2011/0091215 A1   Apr. 21, 2011

Related U.S. Application Data

(63) Continuation of application No. PCT/CN2009/071528, filed on Apr. 28, 2009.

(30) Foreign Application Priority Data

Jun. 30, 2008   (CN) .......................... 2008 1 0129148

(51) Int. Cl.
H04B 10/00   (2006.01)
H04B 10/114   (2013.01)

(52) U.S. Cl.
CPC ................................ *H04B 10/1143* (2013.01)
USPC ......................................... 398/115; 398/128

(58) Field of Classification Search
USPC ........................... 398/115, 118, 121, 125, 128
See application file for complete search history.

(56) References Cited

U.S. PATENT DOCUMENTS

| | | | | |
|---|---|---|---|---|
| 5,742,640 | A * | 4/1998 | Haoui et al. | 375/220 |
| 7,519,297 | B2 * | 4/2009 | Hahin et al. | 398/115 |
| 8,098,990 | B2 * | 1/2012 | Hu et al. | 398/72 |
| 2003/0058890 | A1 * | 3/2003 | Ritchie et al. | 370/486 |
| 2004/0096222 | A1 | 5/2004 | Cagenius | |
| 2008/0232799 | A1 * | 9/2008 | Kim | 398/41 |
| 2010/0284700 | A1 * | 11/2010 | Gopinath | 398/141 |

FOREIGN PATENT DOCUMENTS

| | | |
|---|---|---|
| CN | 2520612 Y | 11/2002 |
| CN | 1914840 A | 2/2007 |
| CN | 101001111 A | 7/2007 |
| CN | 101083499 A | 12/2007 |

(Continued)

OTHER PUBLICATIONS

Written Opinion of the International Searching Authority dated Aug. 6, 2009 in connection with International Patent Application No. PCT/CN2009/071528.

Office Action dated Dec. 19, 2011 in connection with European Patent Application No. 09 771 924.9.

(Continued)

*Primary Examiner* — Dalzid Singh (57) ABSTRACT

In the field of signal processing technologies, a microwave transmission apparatus, a signal processing method and device in a microwave transmission apparatus are provided, which are capable of improving the signal-to-noise ratio of the service signal and the reliability of the communication signal, and increasing the distance between an indoor unit (IDU) and an outdoor unit (ODU). In the technical solutions, a signal processing method in a microwave transmission apparatus includes: directly multiplexing at least a service signal and a non-service signal, and converting the multiplexed electric signal into a multiplexed optical signal; and sending the multiplexed optical signal to an ODU.

9 Claims, 8 Drawing Sheets

FOREIGN PATENT DOCUMENTS

| | | |
|---|---|---|
| CN | 101465705 A | 6/2009 |
| EP | 1 227 605 A2 | 7/2002 |
| JP | 2001244826 A | 9/2001 |
| WO | WO 97/21288 A1 | 6/1997 |

OTHER PUBLICATIONS

International Search Report dated Aug. 6, 2009 in connection with International Patent Application No. PCT/CN2009/071528.

* cited by examiner

MICROWAVE TRANSMISSION APPARATUS, SIGNAL PROCESSING METHOD AND DEVICE IN MICROWAVE TRANSMISSION APPARATUS

CROSS-REFERENCE TO RELATED APPLICATIONS

This application is a continuation of International Application No. PCT/CN2009/071528, filed on Apr. 28, 2009, which claims priority to Chinese Patent Application No. 200810129148.X, filed on Jun. 30, 2008, both of which are hereby incorporated by reference in their entireties.

TECHNICAL FIELD

The present invention relates to signal processing technologies, and more particularly to a microwave transmission apparatus, a signal processing method and device in a microwave transmission apparatus.

BACKGROUND

Figure 1:
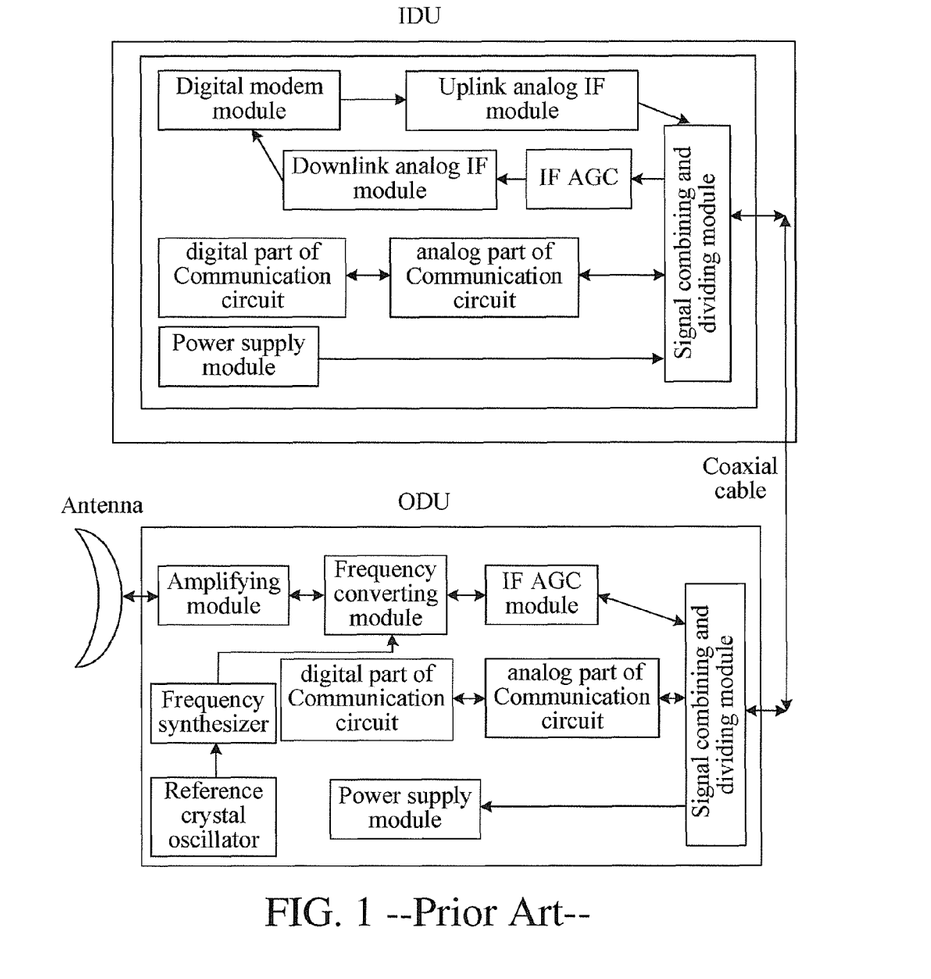
FIG. 1 is a structural diagram of a microwave transmission apparatus in the prior art.

A current microwave transmission apparatus usually adopts a separated system structure. As shown in FIG. 1, a microwave transmission apparatus includes an indoor unit (IDU) and an outdoor unit (ODU). Interaction of service signals, communications signals, and power supply signals is implemented through an interconnected coaxial cable between the IDU and the ODU.

In the following, FIG. 1 is illustrated with processing methods of the microwave transmission apparatus on a service signal and a communication signal. The microwave transmission apparatus processes the signals in two signal processing directions, that is, an uplink direction and a downlink direction, where the uplink direction refers to the signal processing direction from the IDU to the ODU, and the downlink direction refers to the signal processing direction from the ODU to the IDU.

The processing on a service signal in the uplink processing direction mainly includes the following steps.

In step S1, a digital modern module in the IDU modulates the service signal to an intermediate frequency (IF) (for example, 350 MHz), to obtain an uplink IF signal, and sends the uplink IF signal to an uplink analog IF module.

In step S2, the uplink analog IF module filters and amplifies the uplink IF signal appropriately, and sends the processed uplink IF signal to a signal combining and dividing module.

In step S3, the signal combining and dividing module in the IDU multiplexes the processed uplink IF signal with other signals (for example, a communications signal), and sends the multiplexed signal to a coaxial cable to be transmitted to the ODU.

In step S4, the signal combining and dividing module in the ODU receives the multiplexed signal, strips the uplink IF signal out, and sends the stripped signal to an IF AGC module in the ODU.

In step S5, the IF AGC module in the ODU compensates attenuation of the uplink IF signal in the coaxial cable, and sends the compensated uplink IF signal having a relatively constant power to a frequency converting module in the ODU.

In step S6, the frequency converting module performs frequency conversion on the uplink IF signal to convert the IF frequency into a radio frequency (RF), and sends the RF signal to an amplifying module to be amplified and transmitted to a free space through an antenna.

The processing on the service signal in the downlink processing direction mainly includes the following steps.

In step S7, the ODU receives the RF signal from the free space through an antenna, then amplifies the RF signal, and sends the signal to the frequency converting module. The frequency converting module performs frequency conversion on the amplified RF signal to convert its frequency into an IF frequency (for example, 140 MHz), to obtain a downlink IF signal, and sends the downlink IF signal to the IF AGC module in the ODU.

In step S8, the IF AGC module compensates attenuation of the RF signal in the free space, and sends the compensated downlink IF signal having a relatively constant power to the signal combining and dividing module in the ODU.

In step S9, the signal combining and dividing module in the ODU multiplexes the downlink IF signal with other signals (for example, a communications signal), and transmits the multiplexed signal to the IDU through a coaxial cable.

In step S10, the signal combining and dividing module in the IDU receives the multiplexed signal, strips the downlink IF signal out, and sends the stripped signal to an IF AGC module in the IDU.

In step S11, the IF AGC module in the IDU compensates attenuation of the downlink IF signal in the coaxial cable, then sends the compensated downlink IF signal having a relatively constant power to a downlink analog IF module, and sends the processed signal to a digital modem module for demodulation, to obtain a demodulated service signal.

The processing on a communications signal in the uplink processing direction mainly includes the following steps.

In step T1, a digital part of communications circuit in the IDU sends a digital communications signal to a analog part of communications circuit, and the analog part of communications circuit converts the digital communications signal into an analog communications signal, modulates the analog communications signal to an appropriate frequency (for example, 5.5 MHz), to obtain an uplink communications signal, and sends the uplink communications signal to a signal combining and dividing module in the IDU.

In step T2, the signal combining and dividing module in the IDU multiplexes the uplink communications signal with other signals (for example, a service signal), and transmits the multiplexed signal to the ODU through a coaxial cable.

In step T3, the signal combining and dividing module in the ODU strips the uplink communications signal from the multiplexed signal, and sends the stripped signal to an analog part of communications circuit in the ODU.

In step T4, the analog part of communications circuit in the ODU demodulates the uplink communications signal, and sends the demodulated uplink communications signal into a digital part of communications circuit.

The processing on the communications signal in the downlink processing direction is substantially similar to that in the uplink direction, and a difference mainly lies in that the frequency of the downlink communications signal obtained by the communications circuit analog part in the ODU is different from that of the uplink communications signal (for example, 10 MHz).

During the processing of the microwave transmission apparatus on the service signal and the communications signal, a signal combining and dividing module is configured to multiplex two types of signals together in the signal combining and dividing mode by performing frequency division multiplexing in the prior art, and the multiplexed signal is transmitted by a cable in common.

In the implementation of the present invention, the inventor found that the prior art has at least the following problems. In the prior art, a service signal is modulated or demodulated by a digital modem module in an IDU, and the service signal is transmitted or received by an antenna in an ODU, so that the signal-to-noise ratio of the service signal is too low, which is caused by the long distance between the digital modem module and the antenna is too long.

SUMMARY

The present invention is directed to a microwave transmission apparatus and a signal processing method and device in a microwave transmission apparatus, which are capable of significantly improving the signal-to-noise ratio of the service signal.

In order to achieve the above objectives, the present invention employs the following technical solutions.

A signal processing method in a microwave transmission apparatus is provided, which includes the following steps.

An indoor unit (IDU) directly multiplexes at least a service signal and a non-service signal, and converts the multiplexed electric signal into a first multiplexed optical signal.

The IDU sends the first multiplexed optical signal to an outdoor unit (ODU).

A signal processing method in a microwave transmission apparatus is provided, which includes the following steps.

At least a service signal and a non-service signal are directly multiplexed.

The multiplexed signal is sent to an ODU.

A signal processing method in a microwave transmission apparatus is provided, which includes the following steps.

At least a service signal and a non-service signal are directly multiplexed, and the multiplexed electric signal is converted into a multiplexed optical signal.

The multiplexed optical signal is sent to an ODU.

A signal processing method in a microwave transmission apparatus is provided, which includes the following steps.

A multiplexed signal from an IDU is received, where the multiplexed signal includes at least a service signal to be modulated.

The service signal to be modulated is stripped from the multiplexed signal.

The service signal to be modulated is modulated.

The modulated service signal is processed and sent to a free space.

A signal processing method in a microwave transmission apparatus is provided, which includes the following steps.

A multiplexed optical signal from an IDU is received, and the multiplexed optical signal is converted into a multiplexed electric signal, where the multiplexed signal includes at least a service signal to be modulated.

The service signal to be modulated is stripped from the multiplexed signal.

The service signal to be modulated is modulated.

The modulated service signal is processed and sent to a free space.

A signal processing device in a microwave transmission apparatus is provided, which includes a multiplexing unit and a sending unit.

The multiplexing unit is configured to directly multiplex at least a service signal and a non-service signal.

The sending unit is configured to send the multiplexed signal to an ODU.

An IDU, applied in a microwave transmission system, is provided, which includes a multiplexing unit, a converting unit, and a sending unit.

The multiplexing unit is configured to directly multiplex at least a service signal and a non-service signal.

The converting unit is configured to convert the electric signal multiplexed by the multiplexing unit into a multiplexed optical signal.

The sending unit is configured to send the multiplexed optical signal obtained by the converting unit to an ODU.

A signal processing device in a microwave transmission apparatus is provided, which includes a multiplexed signal receiving unit, a stripping unit, a modulating unit, and a processing and sending unit.

The multiplexed signal receiving unit is configured to receive a multiplexed signal from an IDU, where the multiplexed signal includes at least a service signal to be modulated.

The stripping unit is configured to strip the service signal to be modulated from the multiplexed signal.

The modulating unit is configured to modulate the service signal to be modulated.

The processing and sending unit is configured to process the modulated service signal and send the processed signal to a free space.

An ODU, applied in a microwave transmission system, is provided, which includes a multiplexed signal receiving unit, a converting unit, a stripping unit, a modulating unit, and a processing and sending unit.

The multiplexed signal receiving unit is configured to receive a multiplexed optical signal from an IDU, where the multiplexed signal includes at least a service signal to be modulated.

The converting unit is configured to convert the multiplexed optical signal received by the multiplexed signal receiving unit into a multiplexed electric signal.

The stripping unit is configured to strip the service signal to be modulated from the multiplexed electric signal converted by the converting unit.

The modulating unit is configured to modulate the service signal to be modulated after being stripped by the stripping unit.

The processing and sending unit is configured to process the service signal modulated by the modulating unit, and send the processed signal to a free space.

A microwave transmission apparatus is provided, which includes an IDU and an ODU.

The IDU is configured to directly multiplex at least a service signal and a non-service signal, and send the multiplexed signal to the ODU.

The ODU is configured to receive the multiplexed signal from the IDU, where the multiplexed signal includes at least a service signal to be modulated; strip the service signal to be modulated from the multiplexed signal; modulate the service signal to be modulated; and process the modulated service signal, and send the processed signal to a free space.

A microwave transmission apparatus is provided, which includes an IDU and an ODU connected to the ODU through an optical fiber.

The IDU is configured to directly multiplex at least a service signal and a non-service signal, and convert the multiplexed electric signal into a multiplexed optical signal; and send the multiplexed optical signal to the ODU.

The ODU is configured to receive the multiplexed optical signal from the IDU, and convert the multiplexed optical signal into a multiplexed electric signal, where the multiplexed signal includes at least a service signal to be modulated; strip the service signal to be modulated from the multiplexed signal; modulate the service signal to be modulated; and process the modulated service signal, and send the processed signal to a free space.

According to the technical solutions of the present invention, service signals are directly multiplexed by the IDU, the multiplexed signal including a service signal to be modulated is sent to the ODU, and the service signal is modulated by the ODU, so that the distance between a modem and a transceiver antenna is shortened, thereby ensuring to obtain a service signal with a high signal-to-noise ratio.

DETAILED DESCRIPTION

To illustrate the technical solutions of the present invention more clearly, the microwave transmission apparatus, the signal processing method and device in the microwave transmission apparatus according to the embodiments of the present invention are described below in detail with reference to the accompanying drawings.

Figure 2:
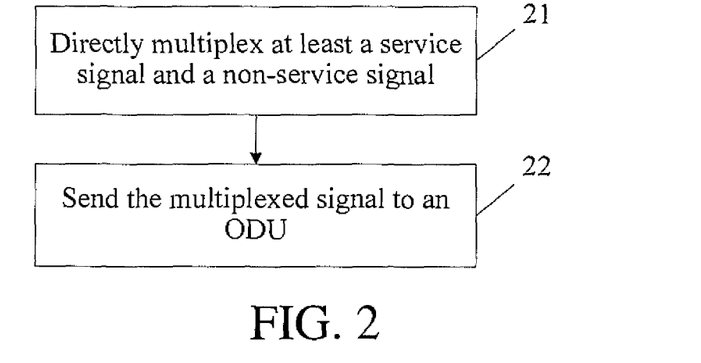
FIG. 2 is a flow chart of a signal processing method in a microwave transmission apparatus according to a first embodiment of the present invention.

In a first embodiment, the present invention provides a signal processing method in a microwave transmission apparatus. As shown in FIG. 2, the method includes the following steps.

In step 21, at least a service signal and a non-service signal are directly multiplexed.

In step 22, the multiplexed signal is sent to an ODU.

According to the technical solution of the embodiments of the present invention, service signals are directly multiplexed by the IDU, the multiplexed signal including a service signal to be modulated is sent to the ODU, and the service signal is modulated by the ODU, so that the distance between a modem and a transceiver antenna is shortened, thereby ensuring to obtain a service signal with a high signal-to-noise ratio.

Figure 3:
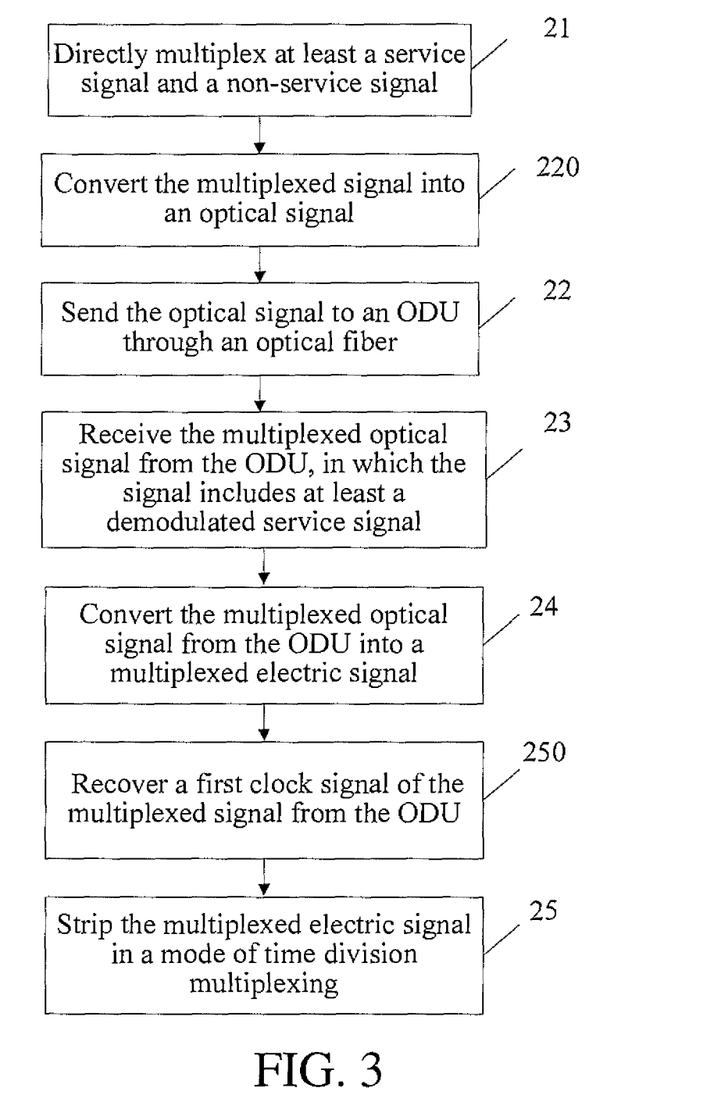
FIG. 3 is a flow chart of a signal processing method in a microwave transmission apparatus according to a second embodiment of the present invention.

As shown in FIG. 3, in a second embodiment, the present invention provides a signal processing method in a microwave transmission apparatus, which includes the following steps.

In step 21, at least a service signal and a non-service signal are directly multiplexed.

In step 22, the multiplexed signal is sent to an ODU.

In the second embodiment of the present invention, the non-service signal mainly refers to a communications signal, and the multiplexing mainly refers to the multiplexing between a service signal and a communications signal, or the multiplexing between different types of service signals.

Optionally, in order to further improve the signal-to-noise ratio of the service signal and achieve the objective of increasing the distance between the IDU and the ODU, as shown in FIG. 3, in the second embodiment, before step 22, the method of the present invention further includes step 220. In step 220, the multiplexed signal is converted into an optical signal.

At this time, step 22 specifically includes sending the optical signal to the ODU through an optical fiber.

According to the second embodiment of the present invention, the IDU first performs electro-optical conversion on the signal, and then transmits the signal through an optical fiber. As the attenuation of the signal in the optical fiber is much lower than that in the cable, by using the optical fiber transmission mode, the distance between the IDU and the ODU can be increased, while the same signal-to-noise ratio as cable transmission is achieved, and when the ODU processes the signal from the IDU subsequently, the ODU does not need to compensate the attenuation of the signal in the cable specifically, so that the costs of the system are reduced.

Optionally, if the multiplexed signal includes a communications signal, in the second embodiment of the present invention, the communications signal may be a digital signal. In the second embodiment of the present invention, the IDU does not convert the digital communications signal into an analog signal and does not need to modulate the analog signal, and transmits the communications signal in the form of a digital signal, so that the problem in the prior art that communications failures are likely to occur due to poor reliability of the analog signal is solved, and the reliability of the communications signal is improved.

The service signal and the communications signal are both baseband signals. In the second embodiment of the present invention, when the multiplexed signal is obtained, optionally, the baseband signals are multiplexed in the mode of time division multiplexing.

The above description illustrates the processing of the IDU on the signal in an uplink direction, and the processing of the IDU on the signal in a downlink direction is described below.

In the second embodiment of the present invention, after step 22, the method further includes step 23.

In step 23, a multiplexed signal from the ODU is received, where the signal includes at least a demodulated service signal.

The IDU receives the multiplexed signal sent by the ODU, and when the multiplexed signal from the ODU is an optical signal, the method further includes step 24.

In step 24, the multiplexed optical signal from the ODU is converted into a multiplexed electric signal.

In the second embodiment of the present invention, when the multiplexing mode of the signal is time division multiplexing, after step 24, the method further includes step 25.

In step 25, the multiplexed electric signal is stripped according to the mode of time division multiplexing.

Optionally, in the second embodiment of the present invention, before step 25, the method further includes step 250. In step 250, a clock signal of the multiplexed signal from the ODU is recovered. At this time, step 25 specifically includes stripping the multiplexed electric signal in the mode of time division multiplexing according to the clock signal.

In the second embodiment of the present invention, a clock data recovery circuit is adopted to recover the clock signal of the multiplexed signal from the ODU.

First, the multiplexed electric signal is sampled according to the clock signal, and then signals in the multiplexed electric signal are stripped in the mode of time division multiplexing. For example, when the multiplexed electric signal includes a service signal and a communications signal, the multiplexed service signal and communications signal after being demodulated are sampled according to the clock signal, and then according to the clock signal, the demodulated service signal is stripped from the communications signal in the mode of time division multiplexing.

Figure 4:
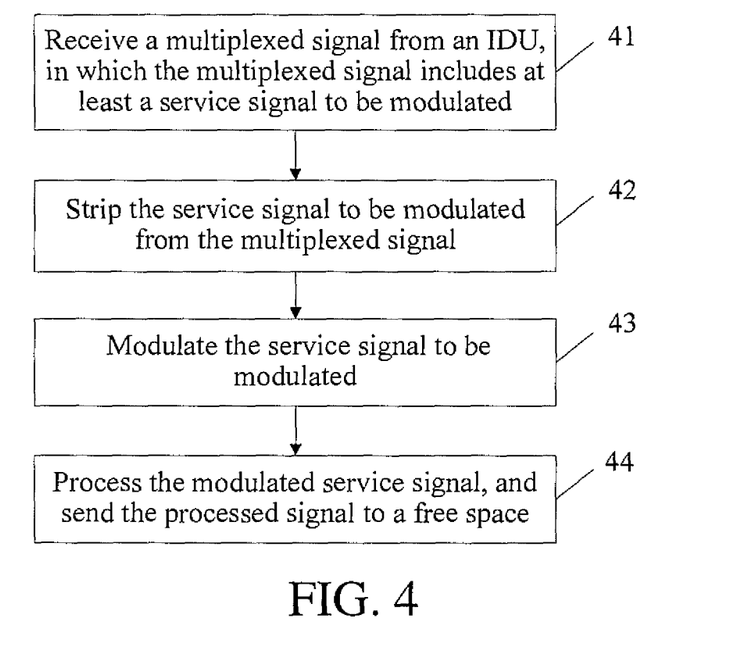
FIG. 4 is a flow chart of a signal processing method in a microwave transmission apparatus according to a third embodiment of the present invention.

In a third embodiment, the present invention provides a signal processing method in a microwave transmission apparatus. As shown in FIG. 4, the method includes the following steps.

In step 41, a multiplexed signal from an IDU is received, where the multiplexed signal includes at least a service signal to be modulated.

In step 42, the service signal to be modulated is stripped from the multiplexed signal.

In step 43, the service signal to be modulated is modulated.

In step 44, the modulated service signal is processed, and sent to a free space.

According to the technical solution of the third embodiment of the present invention, service signals are directly multiplexed by the IDU, the multiplexed signal including a service signal to be modulated after being multiplexed is sent to the ODU, and the service signal is modulated by the ODU, so that the distance between a modem and a transceiver antenna is shortened, thereby ensuring to obtain a service signal with a high signal-to-noise ratio.

Optionally, when the multiplexed signal from the IDU and received by the ODU is an optical signal, after step 41, the method further includes step 411.

In step 411, the multiplexed optical signal from the IDU is converted into a multiplexed electric signal.

Optionally, in the third embodiment of the present invention, the multiplexed signal from the IDU includes a communications signal, and the communications signal is a digital signal.

The ODU does not need to perform analog-to-digital conversion and demodulation on the received digital communications signal, and transmits the communication signal in the form of a digital signal, so that the problem in the prior art that communications failures are likely to occur due to poor reliability of the analog signal is solved, and the reliability of the communications signal is improved.

Optionally, when the multiplexing mode is time division multiplexing, the method further includes recovering a clock signal of the multiplexed signal from the IDU.

The stripping the service signal to be modulated from the multiplexed signal specifically includes stripping the service signal to be modulated from the multiplexed signal in the mode of time division multiplexing according to the clock signal.

In the third embodiment of the present invention, a clock data recovery circuit is adopted to recover the clock signal of the multiplexed signal from the IDU.

In step 43, the service signal to be modulated is modulated.

In the third embodiment of the present invention, the IDU modulates the service signal to be modulated.

In step 44, the modulated service signal is processed, and sent to a free space, which specifically includes the following steps.

In step S1, the modulated service signal is filtered.

In step S2, frequency conversion is performed on the result obtained through filtering.

Optionally, the ODU may use the recovered clock signal in the IDU as a reference clock, adjust a clock of a frequency synthesizer with the reference clock, and perform frequency conversion on the result obtained through filtering by using the frequency synthesizer with an accurate clock.

In the prior art, since the IDU and the ODU in the microwave transmission apparatus use a reference crystal oscillator to provide corresponding system clocks respectively, the system clocks in the IDU and the ODU are not synchronous, and moreover, the ODU is located outdoors, and the environmental conditions are severe, temperature drift may easily occur to the crystal oscillator, resulting in deterioration of precision.

When the ODU performs frequency conversion on the signal, the used frequency synthesizer is synchronous with the reference crystal oscillator in the ODU. As the precision of the reference crystal oscillator is not high, frequency synthesizers in the ODUs in two microwave transmission apparatuses at a receiving end and a sending end of a one-hop microwave are asynchronous, and even the directions of frequency offset between the two frequency synthesizers are opposite to each other, so that a large deviation is caused to the frequency of the signal to be demodulated in the microwave transmission apparatus at the receiving end, and thus the requirement on the performance of the digital modem module in the microwave transmission apparatus at the receiving end is too high.

In the embodiment of the present invention, by using a clock data recovery circuit, the system clock of the ODU is made to be synchronous with the system clock of the IDU. As the reference crystal oscillator in the IDU is located indoors, and the environmental conditions are desirable, the precision of the crystal oscillator remains high, the clocks of the frequency synthesizers in the two ODUs of the one-hop microwave are made to be synchronous with each other, and the frequency offsets of the output clocks of the frequency synthesizers in the two ODUs are ensured to be completely the same, so that a small deviation is caused to the frequency of the signal to be demodulated in the microwave transmission apparatus at the receiving end, and thus the requirement on the digital modem module is lowered.

Furthermore, when the multiplexed signal from the IDU and received by the ODU is an optical signal, that is, the optical fiber transmission mode is used between the IDU and the ODU, as the signal attenuation in the optical fiber is small, in the above step 44, it is not necessary to compensate the attenuation of the signal in the cable, and the costs of the system are reduced.

The method according to the third embodiment of the present invention further includes step T1.

In step T1, an RF signal from a free space is demodulated.

In the embodiment of the present invention, the ODU performs frequency conversion on the RF signal from the free space. Before step T1, the ODU performs frequency conversion on the RF signal from the free space.

Optionally, before step T1, the ODU may perform frequency conversion on the RF signal from the free space according to the clock signal, so that the clocks of the frequency synthesizers in the two ODUs of the one-hop microwave are ensured to be synchronous, and thus the requirement on the digital modem module is lowered.

Figure 5:
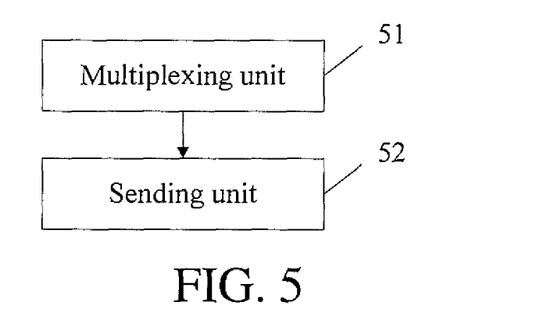
FIG. 5 is a schematic view of a signal processing device in a microwave transmission apparatus according to a fourth embodiment of the present invention.

In a fourth embodiment, the present invention provides a signal processing device in a microwave transmission apparatus. As shown in FIG. 5, the device includes a multiplexing unit 51 and a sending unit 52.

The multiplexing unit 51 is configured to directly multiplex at least a service signal and a non-service signal.

The sending unit 52 is configured to send the multiplexed signal to an ODU.

According to the technical solution of the fourth embodiment of the present invention, service signals are directly multiplexed by the IDU, the multiplexed signal including a service signal to be modulated is sent to the ODU, and the service signal is modulated by the ODU, so that the reliability of the signal is improved and a service signal with a high signal-to-noise ratio is ensured to be obtained, and at the same time, the distance between the IDU and the ODU is increased, and the distance between a modem and a transceiver antenna is shortened, thereby ensuring to obtain a service signal with a high signal-to-noise ratio.

Figure 6:
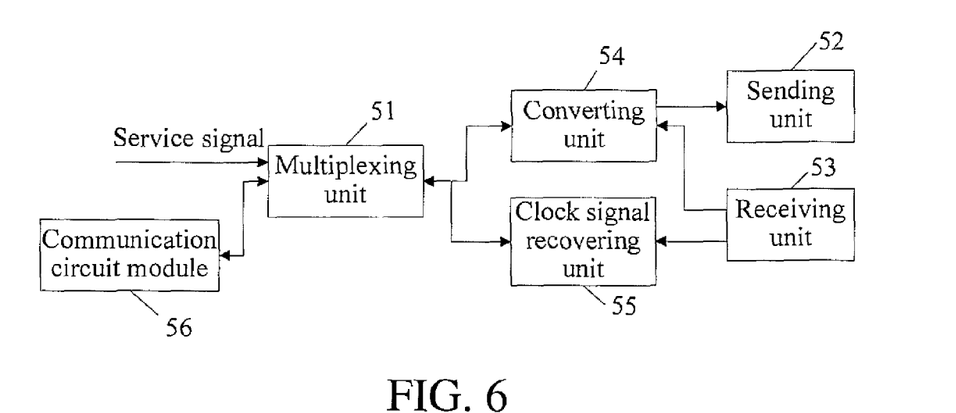
FIG. 6 is a schematic view of a signal processing device in a microwave transmission apparatus according to a fifth embodiment of the present invention.

As shown in FIG. 6, in a fifth embodiment, the present invention provides a signal processing device in a microwave transmission apparatus, which includes a multiplexing unit 51 and a sending unit 52.

The multiplexing unit 51 is configured to directly multiplex at least a service signal and a non-service signal.

The sending unit 52 is configured to send the multiplexed signal to an ODU.

According to the fifth embodiment of the present invention, the signal processing device in a microwave transmission apparatus further includes a receiving unit 53, configured to receive a multiplexed signal from the ODU, where the signal includes at least a demodulated service signal.

Accordingly, in the downlink direction, the multiplexing unit 51 is also configured to strip the multiplexed signal from the ODU.

Furthermore, the device further includes a converting unit 54, configured to covert the multiplexed signal into an optical signal, for the electric signal after being directly multiplexed; and convert the multiplexed optical signal from the ODU into a multiplexed electric signal, for the multiplexed signal from the ODU being an optical signal.

The converting unit 54 ensures the transmission of the optical signal between the IDU and the ODU.

The optical signal is transmitted between the IDU and the ODU through an optical fiber by using the converting unit 54. As the attenuation of the signal in the optical fiber is much lower than that in the cable, by using the optical fiber transmission mode, the distance between the IDU and the ODU can be increased, while the same signal-to-noise ratio as cable transmission is achieved, and when the ODU processes the signal from the IDU subsequently, the ODU does not need to compensate the attenuation of the signal in the cable specifically, so that the costs of the system are reduced.

In the fifth embodiment of the present invention, the multiplexing mode is time division multiplexing. In order to ensure accurate multiplexing and improve the precision of the system clock in the ODU, the device further includes a clock signal recovering unit 55.

The clock signal recovering unit 55 is configured to recover a clock signal of the multiplexed signal received by the receiving unit 53.

Furthermore, according to the signal processing device in a microwave transmission apparatus of the fifth embodiment of the present invention, when the non-service signal includes a communications signal, the communications signal is a digital signal, and a communications circuit module 56 of the device, when providing a communications signal, does not need to perform analog-to-digital conversion and demodulation on the digital communications signal and transmits the communications signal in the form of a digital signal, so that the problem in the prior art that communications failures are likely to occur due to poor reliability of the analog signal is solved, and the reliability of the communications signal is improved.

The signal processing device in a microwave transmission apparatus may be realized by an IDU in a microwave transmission system.

Figure 7:
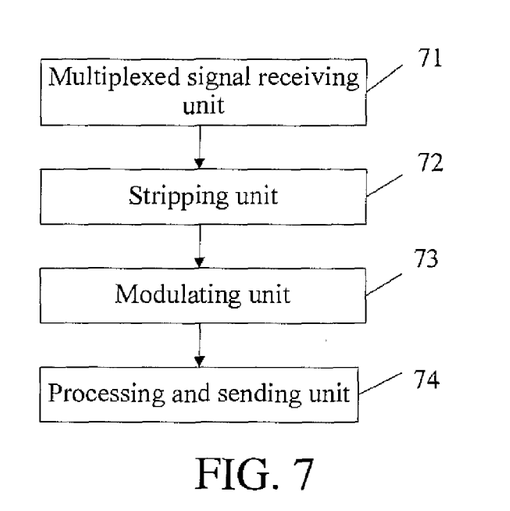
FIG. 7 is a schematic view of a signal processing device in a microwave transmission apparatus according to a sixth embodiment of the present invention.

In a sixth embodiment, the present invention provides a signal processing device in a microwave transmission apparatus. As shown in FIG. 7, the device includes a multiplexed signal receiving unit 71, a stripping unit 72, a modulating unit 73, and a processing and sending unit 74.

The multiplexed signal receiving unit 71 is configured to receive a multiplexed signal from an IDU, where the multiplexed signal includes at least a service signal to be modulated.

The stripping unit 72 is configured to strip the service signal to be modulated from the multiplexed signal.

The modulating unit 73 is configured to modulate the service signal to be modulated.

The processing and sending unit 74 is configured to process the modulated service signal, and send the processed signal to a free space.

According to the technical solution of the sixth embodiment of the present invention, service signals are directly multiplexed by the IDU, the multiplexed signal including a service signal to be modulated is sent to the ODU, and the service signal is modulated by the ODU, so that the distance between a modem and a transceiver antenna is shortened, thereby ensuring to obtain a service signal with a high signal-to-noise ratio.

Figure 8:
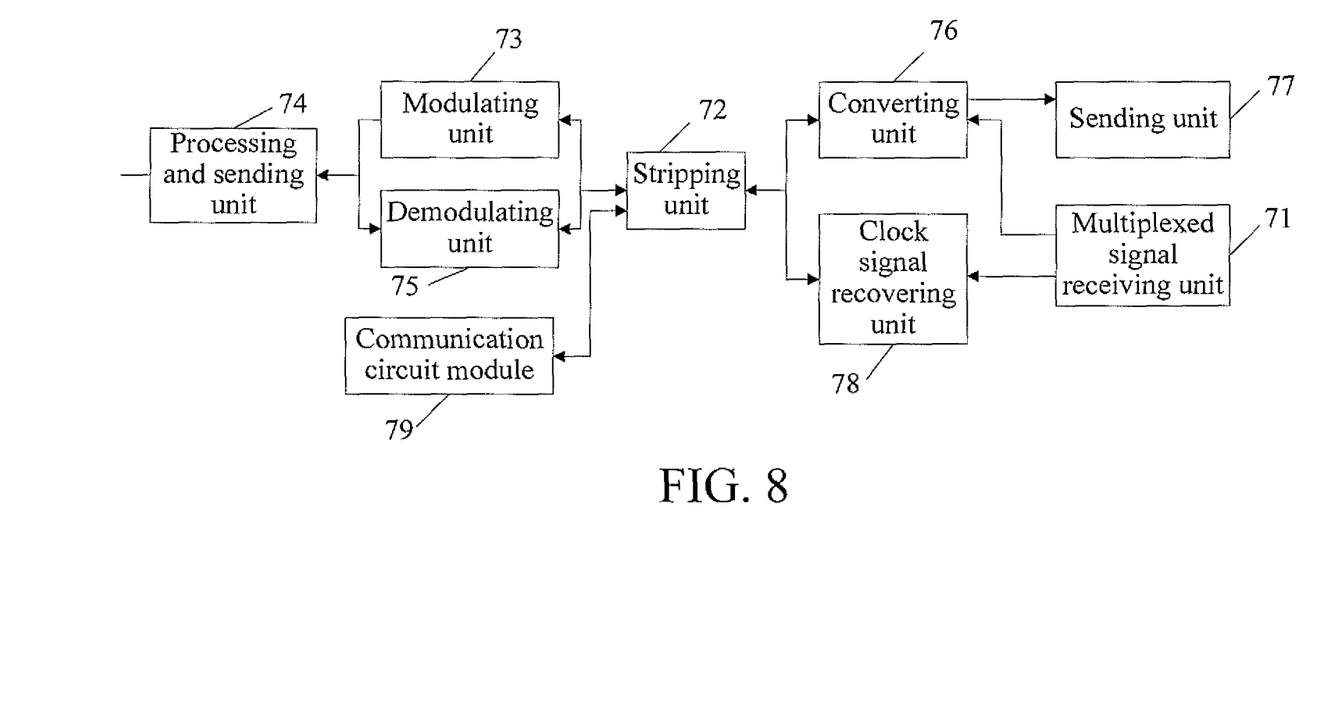
FIG. 8 is a schematic view of a signal processing device in a microwave transmission apparatus according to a seventh embodiment of the present invention.

As shown in FIG. 8, in the seventh embodiment of the present invention, besides the multiplexed signal receiving unit 71, the stripping unit 72, the modulating unit 73, and the processing and sending unit 74, the device further includes a demodulating unit 75, configured to demodulate the service signal from the free space, multiplex the demodulated signal with a non-service signal, and send the multiplexed signal to the IDU.

Optionally, in order to ensure transmission of the optical signal through an optical fiber between the IDU and the ODU, the device further includes a converting unit 76, configured to convert a multiplexed optical signal into a multiplexed electric signal, for the multiplexed optical signal from the IDU; and covert a multiplexed electric signal into a multiplexed optical signal, for an electric signal obtained by multiplexing the service signal from the free space with a non-service signal.

In the downlink direction, the stripping unit 72 is further configured to multiplex the service signal from the free space with a non-service signal.

The device further includes a sending unit 77, configured to send the multiplexed signal after being demodulated by the demodulating unit to the IDU, where the signal includes at least a demodulated service signal.

Corresponding to the multiplexing mode in the IDU, when the multiplexing mode adopted in the seventh embodiment of the present invention is time division multiplexing, the device further includes a clock signal recovering unit 78.

The clock signal recovering unit 78 is configured to recover a clock signal of the multiplexed signal from the IDU.

The processing and sending unit 74 is configured to filter the modulated service signal and the signal from the free space after frequency conversion; and perform frequency conversion on the result obtained by filtering and perform frequency conversion on the RF signal from the free space.

In the seventh embodiment of the present invention, as the optical fiber transmission mode is adopted, the processing and sending unit 74 does not need to compensate the attenuation in the cable, and thus the costs of the system are reduced.

Furthermore, according to the signal processing device in a microwave transmission apparatus of the seventh embodiment of the present invention, when the non-service signal includes a communications signal, the communications signal is a digital signal, and a communications circuit module 79 of the device, when providing a communication signal, does not need to perform analog-to-digital conversion and demodulation on the digital communications signal and transmits the communications signal in the form of a digital signal, so that the problem in the prior art that communications failures are likely to occur due to poor reliability of the analog signal is solved, and the reliability of the communications signal is improved.

The signal processing device in a microwave transmission apparatus may be realized by an IDU in a microwave transmission system.

Figure 9:
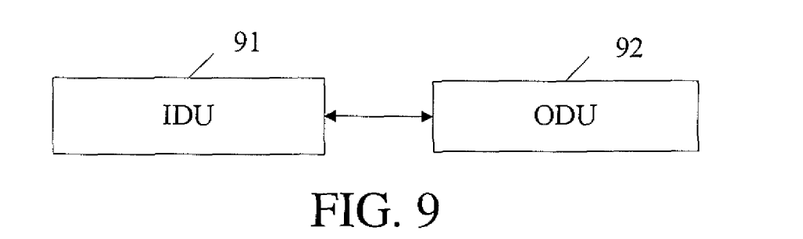
FIG. 9 is a schematic view of a microwave transmission apparatus according to an embodiment of the present invention.

In an embodiment, the present invention provides a microwave transmission apparatus. As shown in FIG. 9, the apparatus includes an IDU 91 and an ODU 92.

The IDU 91 is configured to directly multiplex at least a service signal and a non-service signal, and send the multiplexed signal to the ODU 92.

The ODU 92 is configured to receive the multiplexed signal from the IDU 91, where the multiplexed signal includes at least a service signal to be modulated; strip the service signal to be modulated from the multiplexed signal; modulate the service signal to be modulated; and process the modulated service signal, and send the processed signal to a free space.

In an embodiment of the present invention, the IDU 91 and the ODU 92 may be connected through an optical fiber to realize transmission of an optical signal. When the non-service signal includes a communications signal, the communications signal is a digital signal.

Figure 10:
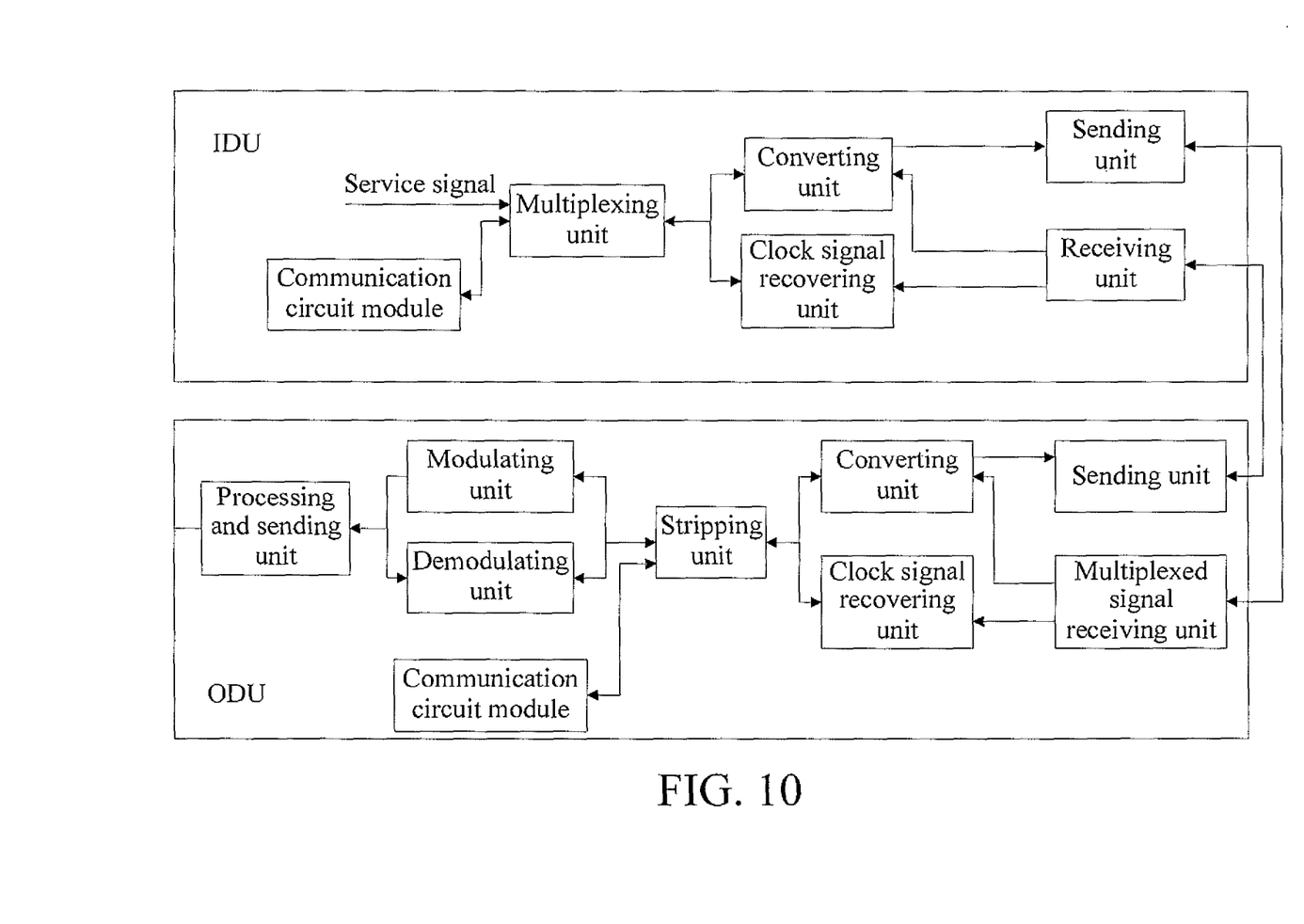
FIG. 10 is a structural diagram of another microwave transmission apparatus according to an embodiment of the present invention.

In an embodiment, the present invention provides another microwave transmission apparatus, and FIG. 10 shows the specific structure of the apparatus. The working mode of various function modules in the apparatus as shown in FIG. 10 may refer to the corresponding signal processing device in the above microwave transmission apparatus, and the details will not be described herein again.

According to the technical solution of the embodiment of the present invention, service signals are directly multiplexed by the IDU 91, the multiplexed signal including a service signal to be modulated after being multiplexed is sent to the ODU 92, and the service signal is modulated by the ODU 92, so that the distance between a modem and a transceiver antenna is shortened, thereby ensuring to obtain a service signal with a high signal-to-noise ratio.

Persons of ordinary skill in the art may understand that all or part of the steps of the method according to the embodiments of the present invention may be implemented by a program instructing relevant hardware. The program may be stored in a computer readable storage medium.

The above descriptions are merely some exemplary embodiments of the present invention, but not intended to limit the scope of the present invention. It is apparent that those skilled in the art can make various modifications and variations to the invention without departing from the spirit and scope of the invention. The modifications and variations should fall within the scope defined by the appended claims.

What is claimed is:

1. A signal processing method in a microwave transmission apparatus, the method comprising:
    directly multiplexing, by an indoor unit (IDU), at least a service signal and a non-service signal, and converting the multiplexed electric signal into a first multiplexed optical signal; and
    sending, by the IDU, the first multiplexed optical signal to an outdoor unit (ODU); and
    receiving, by the IDU, a second multiplexed optical signal from the ODU, and converting the second multiplexed optical signal into a second multiplexed electric signal, wherein the second multiplexed optical signal from the ODU comprises at least a demodulated service signal.

2. The signal processing method in a microwave transmission apparatus according to claim 1, further comprising:
    recovering, by the IDU, a clock signal of the second multiplexed optical signal from the ODU; and
    stripping, by the IDU, the second multiplexed electric signal in a mode of time division multiplexing according to the clock signal.

3. The signal processing method in a microwave transmission apparatus according to claim 1, further comprising:
    multiplexing, by the ODU, a service signal from the free space after being demodulated with a non-service signal, to obtain the second multiplexed electric signal; and
    converting, by the ODU, the second multiplexed electric signal into the second multiplexed optical signal, and sending the second multiplexed optical signal to the IDU, wherein the second multiplexed optical signal comprises at least a demodulated service signal.

4. A signal processing method in a microwave transmission apparatus, the method comprising:
    directly multiplexing, by an indoor unit (IDU), at least a service signal and a non-service signal, and converting the multiplexed electric signal into a first multiplexed optical signal;
    sending, by the IDU, the first multiplexed optical signal to an outdoor unit (ODU);
    receiving, by the ODU, the first multiplexed optical signal from the indoor unit (IDU), and converting the first multiplexed optical signal into a first multiplexed electric signal, wherein the first multiplexed signal comprises at least a service signal to be modulated;
    stripping, by the ODU, the service signal to be modulated from the first multiplexed electrical signal;
    modulating, by the ODU, the service signal to be modulated; and
    processing, by the ODU, the modulated service signal, and sending the processed signal to a free space.

5. The signal processing method in a microwave transmission apparatus according to claim 4, wherein the stripping the service signal to be modulated from the multiplexed signal comprises:
    recovering, by the ODU, a clock signal of the first multiplexed optical signal from the IDU; and
    stripping, by the ODU, the service signal to be modulated from the first multiplexed electric signal in a mode of time division multiplexing according to the clock signal.

6. An indoor unit (IDU), applied in a microwave transmission system, comprising:
    a multiplexing unit, configured to directly multiplex at least a service signal and a non-service signal;
    a converting unit, configured to convert the electric signal multiplexed by the multiplexing unit into a multiplexed optical signal;

a sending unit, configured to send the multiplexed optical signal obtained by the converting unit to an outdoor unit (ODU);

a receiving unit configured to receive the multiplexed optical signal from the ODU, wherein the signal comprises at least a demodulated service signal; and wherein the converting unit is further configured to convert the multiplexed optical signal received by the receiving unit into a multiplexed electric signal.

7. An indoor unit (IDU), applied in a microwave transmission system, comprising:

a multiplexing unit, configured to directly multiplex at least a service signal and a non-service signal;

a converting unit, configured to convert the electric signal multiplexed by the multiplexing unit into a multiplexed optical signal;

a sending unit, configured to send the multiplexed optical signal obtained by the converting unit to an outdoor unit (ODU); and a clock signal recovering unit, configured to recover a clock signal of the multiplexed optical signal received by the receiving unit, wherein the recovered clock signal is for being used in stripping the multiplexed signal.

8. An outdoor unit (ODU), applied in a microwave transmission system, comprising:

a multiplexed signal receiving unit, configured to receive a multiplexed optical signal from an indoor unit (IDU), wherein the multiplexed signal comprises at least a service signal to be modulated;

a converting unit, configured to convert the multiplexed optical signal received by the multiplexed signal receiving unit into a multiplexed electric signal;

a stripping unit, configured to strip the service signal to be modulated from the multiplexed electric signal converted by the converting unit;

a modulating unit, configured to modulate the service signal to be modulated after being stripped by the stripping unit;

a processing and sending unit, configured to process the service signal modulated by the modulating unit, and send the processed signal to a free space;

a demodulating unit, configured to demodulate the service signal from the free space, and multiplex the service signal with a non-service signal, to obtain a multiplexed electric signal;

wherein the converting unit is further configured to convert the multiplexed electric signal output by the demodulating unit into an optical signal; and a sending unit, configured to send the multiplexed optical signal converted by the converting unit to the IDU, wherein the signal comprises at least a demodulated service signal.

9. An outdoor unit (ODU), applied in a microwave transmission system, comprising:

a multiplexed signal receiving unit, configured to receive a multiplexed optical signal from an indoor unit (IDU), wherein the multiplexed signal comprises at least a service signal to be modulated;

a converting unit, configured to convert the multiplexed optical signal received by the multiplexed signal receiving unit into a multiplexed electric signal;

a stripping unit, configured to strip the service signal to be modulated from the multiplexed electric signal converted by the converting unit;

a modulating unit, configured to modulate the service signal to be modulated after being stripped by the stripping unit;

a processing and sending unit, configured to process the service signal modulated by the modulating unit, and send the processed signal to a free space; and a clock signal recovering unit, configured to recover a clock signal of the multiplexed optical signal received by the multiplexed signal receiving unit, wherein the recovered clock signal is for being used in stripping the multiplexed signal.

* * * * *